July 11, 1972   J. C. CASTLEBERRY   3,676,017
SPEED CONTROL
Filed April 27, 1970

INVENTOR.
J. C. CASTLEBERRY
BY
Robb & Robb
attorneys

//  3,676,017
// SPEED CONTROL
Joseph C. Castleberry, Birmingham, Ala., assignor to
Altec, Inc., Birmingham, Ala.
Filed Apr. 27, 1970, Ser. No. 31,906
Int. Cl. F04b 49/00
U.S. Cl. 417—34                                     3 Claims

ABSTRACT OF THE DISCLOSURE

The disclosure herein is of a speed control for use particularly with hydraulically operated mechansms which demand increased pressure when a load is imposed thereon, such mechanisms being primarily engine driven by hydraulic pumps in a hydraulic system in which it is desirable to regulate the speed by in turn regulating the throttle by which the engine speed is actually controlled. The actual control of the mechanism is effected by a valve which receives the pressure from the hydraulic system, and upon increased demand therefor in turn operates a valve member to direct vacuum developed in the engine by which the entire mechanism is driven, to a vacuum actuator which is in turn connected to the throttle and thereby upon increased vacuum produced, in turn increases the speed of the engine whereby the pressure in the hydraulic pump driven thereby is likewise increased, the hydraulic and vacuum systems being entirely separate to obviate any possibility of hydraulic balance which would prevent return of the engine to normal speed when the pressure is removed from the hydraulic system.

OBJECTS OF THE INVENTION

The primary object of the instant invention is to provide a load responsive system which automatically regulates the operating speed of an engine driving a hydraulic or fluid system pump, which in turn directs its product to some kind of a tool or mechanism which requires hydraulic pressure, and increasing pressures as the load is imposed thereupon.

More specifically, the invention herein comprises and has for its object, valve means which are arranged so as to be responsive to pressure in the hydraulic system which, as the demand increases, will in turn increase the pressure by regulating the speed of the engine which produces the pressure through a hydraulic pump or similar instrumentality, such valve control operating which is in effect a separate system for control of the speed by vacuum actuating means connected to the throttle of the said engine.

A further object of the invention is to provide a compact arrangement in a valve which separates the hydraulic and vacuum systems in a speed control device of the class hereinunder consideration so that any balance in a common system is overcome by reason of the two systems so to speak, which balance would normally require considerable additional mechanism to overcome.

Another object of the invention is to provide valve means which may be located a substantial distance from any heat source, and are therefore not affected thereby since in the hydraulic system to which the valve arrangement is particularly adapted, the heating of the hydraulic fluid is obviated and yet control of the speed is adequately responsive to the demands imposed on the system since the medium for regulating such speed is not affected materially by the heat changes or conditions in an adverse manner.

Another object of the invention is to provide a valve mechanism which may be directly connected to a hydraulic pump so as to be responsive to pressure developed in said pump and particularly to the demand created in a system supplied by said pump, whereby increased pressure demand is translated into movement of hydraulic instrumentalities which in turn regulate vacuum response, which is translated in turn to actuating means whereby the throttle of the engine driving the pump is regulated in a direct, simple and yet remote manner if desired to obviate some of the problems of heat, line losses and similar difficulties inherent in prior art systems.

Other and further objects of the invention will be understood from a consideration of the specification appended hereto and disclosed in the drawing, wherein.

Figure 1:
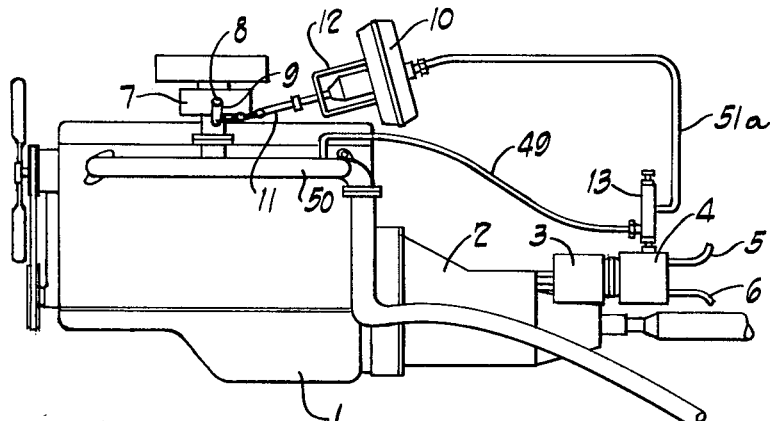
FIG. 1 is a generally diagrammatic view, illustrating the principal elements in the system to which the mechanism herein is intended to be incorporated, including a motor and connections of the same with hydraulic pump and vacuum actuating means, with the control valve for controlling the speed of the system indicated in its relationship.

Referring now to the drawing and particularly to FIG. 1, an internal combustion motor is indicated at 1 in a generally schematic manner, having the usual transmission 2 driven thereby, from which transmission a power take-off, indicated at 3 is in turn driven, and the power take-off in any conventional manner is connected to a hydraulic pump generally designated 4. The hydraulic pump in this instance includes the usual pressure lines 5 and 6 which in turn lead to a device to be driven by the hydraulic pump such as a work performing boom for example, of any preferred form.

The motor 1 is shown as being equipped with a carburetor generally designated 7, the carburetor 7 in turn having a throttle shaft 8 with a throttle lever 9 connected thereto for moving said throttle shaft in accordance with conventional throttle control construction.

In this particular instance, the throttle level 9 is connected with a vacuum actuator 10 of well-known construction, being essentially a vacuum dash-pot by means of the linkage 11, the dash-pot having limiting means 12 thereon so that in combination with the clevis adjustment setting of any desired initial engine speed may be accomplished.

Figure 2:
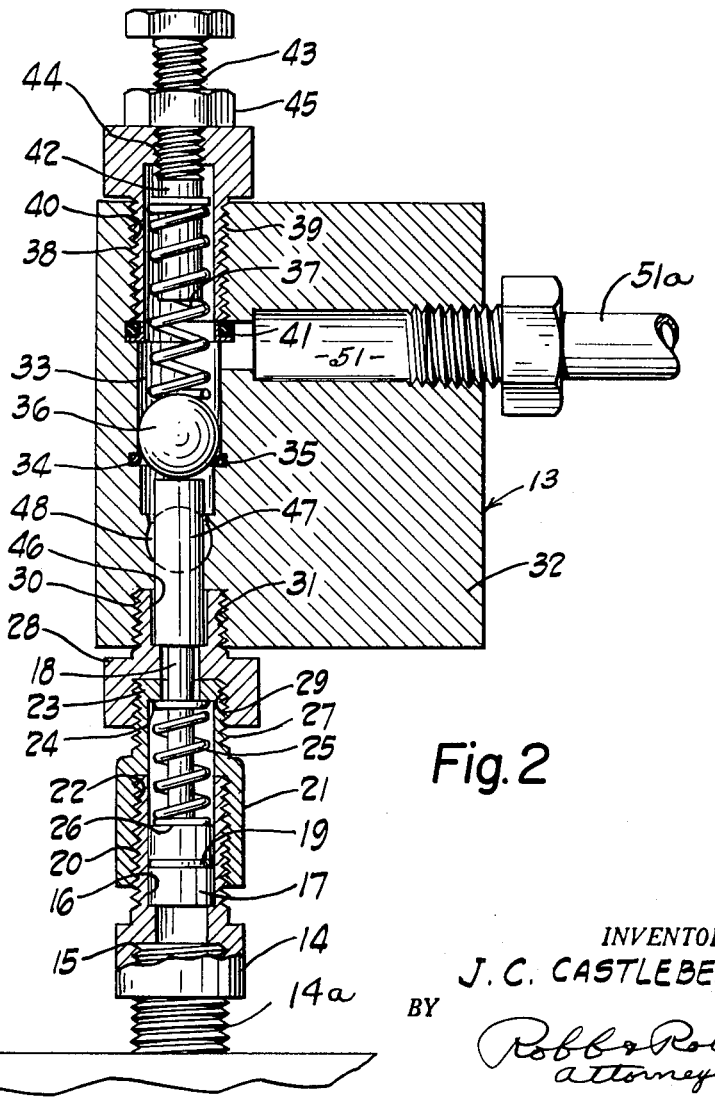
FIG. 2 is an enlarged sectional view of the valve means which controls the speed of the motor in response to the condition of hydraulic pressure in the hydraulic pump.

The hydraulic pump 4 previously mentioned is of any conventional form as previously suggested and controlled by a suitable control valve, in this instance however, being equipped with the valve unit generally designated 13 and shown in greater detail in FIG. 2.

The connection of the valve unit 13 with the pump 4 is effected by mounting the unit directly on the pump if desired and in this instance shown in that manner; so that pressure developed within the pump is in turn directly transmitted to the valve unit 13, the connection in this instance being effected through a cylinder member 14, having the threads 15 within one end suitably connected to a nipple 14a extending upwardly from the pump 4.

The cylinder member 14 is intended to support therewithin in the cylinder portion 16 thereof a piston member 17 having the rod 18 integral therewith, the piston 17 in this instance having a seal 19 thereon to operate within the cylinder portion 16.

The cylinder member 14 is in turn engaged by the threads 20 with a spring enclosure or spring box 21, which spring box 21 has the threads 22 for engaging the threads 20, and a spring enclosing section 23 with a shoulder 24 at one end thereof to engage one end of a compression spring 25, and at the other end the spring 25 engaging the shoulder 26 on the piston 17 previously mentioned; the spring surrounding the piston rod 18.

The spring enclosure 21 by means of threads 27 thereon, in turn engages a seat and adapter 28 by threads 29 therein, the seat and adapter 28 in turn having a threaded section 30 thereon engaging corresponding threads 31 at one end of the valve unit 13 and specifically the body 32 thereof.

As will be observed from FIG. 2, the seat and adapter 28 is located at one end of a passage generally designated 33 which extends from end to end of the body 32 at one side thereof.

The passage 33 includes a seat 34 which in turn supports an O-ring seal indicated at 35.

The seat 34 in conjunction with the seal 35 provides for sealing of the passage 33 by means of a ball valve member 36 which is maintained in seated position by means of a spring 37 which is engaged with the ball at one end thereof, and is in turn supported within a spring housing and adjusting box 38, this spring housing 38 being provided with threads 39 thereon engaging corresponding threads 40 within the passage 33 previously mentioned, a suitable seal such as 41 being provided.

The spring housing 38 is arranged to receive for movement therewithin a spring adapter 42 adapted to be acted upon by a threaded adjustment bolt 43 operating in a suitable threaded section 44 of the spring housing 38, with a lock-nut 45 being provided to maintain the adjustment once established.

It will therefore be seen that upon manipulating the adjustment bolt 43, tension on the spring 37 may be increased and decreased as necessary to carry out the function of the device in a manner to be subsequently described.

The seat and adapter 28 is in turn arranged to have an opening 46 therein aligned with the passage 33 in such a manner as to receive and support for movement a spacer 47 which is a cylindrical member in this case, adapted to act upon the ball valve member 36 in a manner to be subsequently set forth.

The passage 33 is connected by means of an off-standing passage 48 and a line 49 as indicated in FIG. 1, leading to the intake manifold suggested at 50 in said figure, whereby vacuum developed within said intake manifold is directed toward and into the passage 33.

Vacuum developed within the passage 33 therefore may be in turn directed to another passage 51 and line 51a at the other side of the ball valve member 36 from the passage 48 previously mentioned; this line 51a as indicated in FIG. 1, extending to the vacuum actuator or vacuum dash-pot 10 previously mentioned so as to transfer the vacuum developed to such actuator 10.

With the foregoing details of construction of the respective parts in mind, the operation of the system may be described as though the engine or motor 1 is in operation, and thereby operating the power take-off 3 and the pump 4 connected therewith.

Assuming that the pump 4 is being driven by the motor at idle speed, a requirement is imposed upon the pump to supply hydraulic pressure developed thereby to a boom or the like as initially suggested, through control means not shown but well known in the art, and thus pressure in the pump must increase.

Increasing pressure in the pump 4, in turn directs such pressure to the piston 17 and as suggested in FIG. 2, acts against the spring 25, and by means of the piston rod 18 causes the spacer 47 to be moved upwardly and in turn move the ball member 36 similarly, since vacuum is directed through the passage 48 into the passage 33, it will be observed that the vacuum may thereupon pass around the valve member 36, and in turn be impressed upon the passage 51 to line 51a.

The vacuum so directed to the passage 51 will in turn be effective upon the actuator 10, and cause the linkage connected therewith and specifically the linkage 11 of course to operate the throttle arm 9 to rotate the throttle shaft 8 and open the throttle of the motor.

Opening the throttle of the motor will of course speed the motor up and in turn cause the pump to be speeded up to meet the required demand and be held at any predetermined demand requirement in accordance with the delivery of the vacuum under the control of the position of the ball member 36.

Thus, increasing pressure demand moves the ball member 36 further upwardly by means of the piston 17 and rod 18 acting on the spacer 47 to further increase engine speed as may be necessary.

When the pressure demand is reduced, the dash-pot or actuator 10, being of conventional form, will permit the throttle to be closed at a uniform relatively slow rate so that if demand is suddenly imposed again on the pump, the motor will not have been entirely throttled back to its normal idle position but will be able to pick up speed with a minimum amount of fluctuation.

While the foregoing description has been made upon the basis of demand, it will be apparent that by suitable manipulation of the respective parts, and particularly of the adjustment of the spring 37, varying demands may be met within a relatively wide range and to suit the necessary operation perhaps of several different working devices which require hydraulic pressure from the pump 4.

It is also pointed out that if desired, the vacuum directed by the line 51a to the actuator 10 may be controlled by separate lever means if desired, so that virtually an overriding of the automatic control could be effected if desired.

I claim:

1. In an engine driven fluid pump-motor system having a system pressure downstream of the pump, wherein the engine has a manifold and the speed thereof is regulated by a throttle, the improvement comprising, a vacuum sensing line operably connected to said manifold, vacuum operated throttle control means operably connected to said throttle, valve means interposed between said vacuum sensing line and said throttle control means, said valve means being connected to isolate said throttle control means from said vacuum sensing line when the sensed pressure is less than a given value and to connect said vacuum operated throttle control means to said vacuum sensing line when the sensed pressure equals or exceeds said given pressure to regulate the speed of the engine and thereby the fluid flow from said pump by the vacuum in the manifold, and valve actuating means communicating with said system pressure and operatively connected to said valve means.

2. The invention as defined in claim 1 wherein said pressure sensing means includes a ball check valve and valve seat, and biasing means normally urging said ball onto said seat.

3. The invention as defined in claim 2 further characterized by means to adjust the force of said biasing means to thereby adjust the pressure at which said ball check valve will open.

References Cited

UNITED STATES PATENTS

| 2,009,659 | 7/1935 | Hill et al. | 417—34 |
| 2,609,755 | 9/1952 | Griswold | 417—18 |
| 3,101,670 | 8/1963 | Olson | 417—34 |
| 2,925,066 | 2/1960 | Thorner | 123—103 |
| 3,176,459 | 4/1965 | Parker | 417—34 |
| 3,459,131 | 8/1969 | Senf | 417—34 |
| 2,634,681 | 4/1953 | Rowell | 417—34 |
| 2,948,271 | 8/1960 | Ignatjeu | 123—102 |
| 2,047,702 | 7/1936 | Pfeil | 123—102 |

WILLIAM L. FREEH, Primary Examiner